United States Patent [19]

Pinkerman

[11] 4,224,675
[45] Sep. 23, 1980

[54] PORTABLE CHECKBOOK-BALANCE CALCULATING DEVICE

[76] Inventor: John P. Pinkerman, 211 E. Fairview Ave., Glendale, Calif. 91207

[21] Appl. No.: 968,308

[22] Filed: Dec. 11, 1978

[51] Int. Cl.² ............................................. G06F 15/02
[52] U.S. Cl. ..................................... 364/705; 364/708
[58] Field of Search ...................... 364/705, 709, 708; 150/34, 35

[56] References Cited

U.S. PATENT DOCUMENTS

| 3,764,791 | 10/1973 | Kashio | 364/709 |
| 3,920,979 | 11/1975 | Kilby et al. | 364/705 |
| 4,075,702 | 2/1978 | Davies | 364/705 |

OTHER PUBLICATIONS

"'Compact,' 'Diary,' Checkbook All Count," *Electronics*, Apr. 3, 1975, pp. 40-41.

*Primary Examiner*—Jerry Smith

[57] ABSTRACT

The improved portable check recordal device of the present invention includes a cover within which are disposed a block of checks, a check recordal pad and a check calculator, held in the cover by tabs or the like in one or more cover pockets. At least the calculator can be moved by its retaining means to a position outside the cover while still being secured to the cover. Such retaining means may also bear, for example, a memo pad, container, mirror or the like. In one embodiment, both the pad and the block can be slid sideways to parallel each other and overlap the sides of the cover but not each other, and the pad or block carries the calculator with it, for convenience of use. The calculator may be electronic and include recessed keys and plus and minus signs visually displayed in a readout window. One embodiment will purposely exclude all functions, except addition and subtraction for simplicity of operation. The calculator may further have a permanent decimal point and a double zero key, and it may retain the last figures (balance) readout before inactivation, to avoid having to re-enter them upon reactivating the calculator. Since the keys on the calculator would probably be closely spaced, it would be advisable to employ a stylus or a small diameter pen having a reduced opposed end for easy selective depression of a desired key. The device is simple, compact, efficient, easy to use and durable.

4 Claims, 5 Drawing Figures

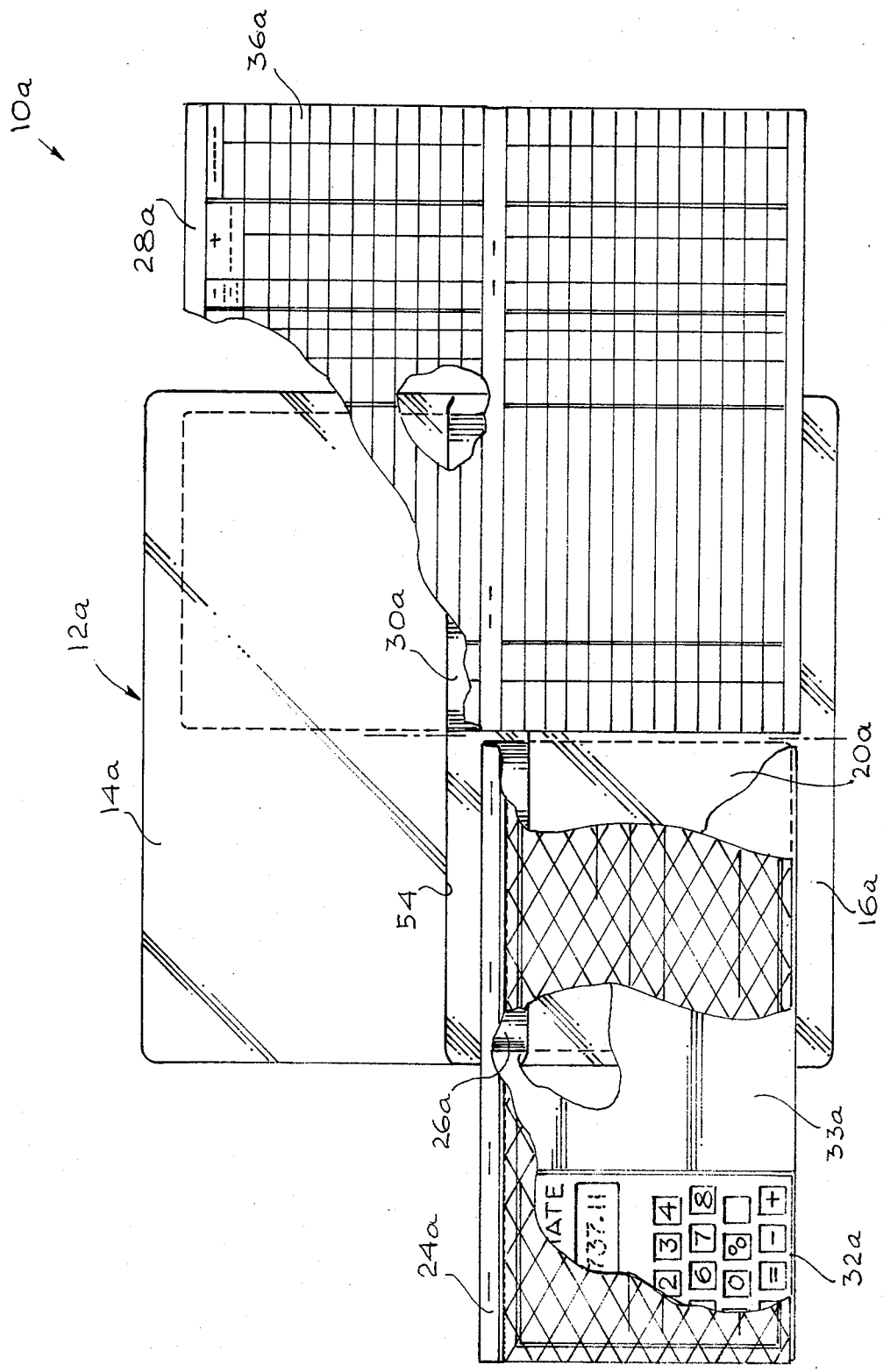

PORTABLE CHECKBOOK-BALANCE CALCULATING DEVICE

BACKGROUND OF THE INVENTION

1. Field of the Invention

The present invention generally relates to recording means and more particularly to portable checkbook-balance calculating and recording means of an improved type.

2. Prior Art

Conventionally, bank checks are carried in a cover which also retains a check recordal pad. When a deposit slip or a check is made out and taken from the pad, the deposit or check information, including the number, amount, etc., is listed in the check recordal pad, and the running balance is mentally calculated and brought down by hand. Frequently, errors are made in the subtraction which must be made to determine the proper balance. Such errors, once made, are difficult to detect and are usually carried along until the check owner receives a monthly statement, and tries to balance his or her checking account. Much work is then needed to trace the source of the error or errors.

Although mechanical and/or electronic calculators can be employed to correctly calculate check balances, most persons do not have them available for use each time a check is drawn. Accordingly, it would be desirable to provide improved portable check recordal means which would assure the maintenance of properly computed running check balances and still would be compact, efficient and convenient.

SUMMARY OF THE INVENTION

The improved portable check recordal device of the present invention satisfies the foregoing needs. The invention is substantially as set forth in the Abstract above. Thus, the device includes a cover with one or more pockets, and a check block, a recordal pad and a calculator disposed within the cover, each being held therein by a tab or the like within one or more cover pockets. At least the calculator is movable, preferably sideways, between a position within the cover and an uncovered position outside of the cover, for ease of use, while still being held by the tab or the like which remains in the cover pocket. The pad and/or block can, if desired, be made to slide, preferably sideways, from a fully covered to a partially or wholly uncovered position, and, if desired, bear the calculator therewith. The calculator itself may be particularly adapted for check recordal calculations and may have a permanent decimal point, a double zero key, recessed keys, and plus and minus signs visible in the readout window. The calculator may also retain the last figures displayed, usually a remaining balance, before inactivation. The calculator can be made small, thin and simple enough to be economical, efficient and highly compact. Further advantages and features are set forth in the following detailed description and accompanying drawings.

DRAWINGS

Figure 5:
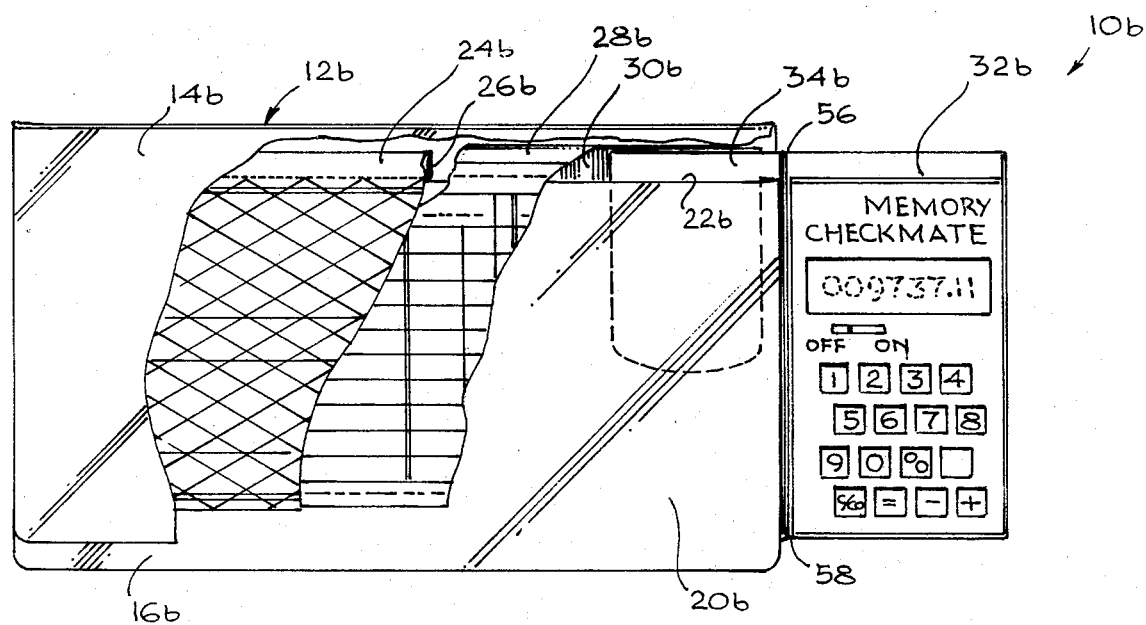

FIG. 4 is a schematic front elevation of a second preferred embodiment of the improved portable check recordal device of the present invention, shown with the check block and calculator thereof slid to and extending from one side of the open cover thereof and with the check recordal pad slid to and extending from the opposite side of the cover so as to parallel the check block in non-overlapping relation for easy use; and, FIG. 5 is a schematic front elevation of a third preferred embodiment of the improved portable check recordal device of the present invention, shown with the calculator thereof extending from one side of the cover thereof, and with the check block and recording pad still under said cover.

DETAILED DESCRIPTION

FIGS. 1-3

Figure 1:
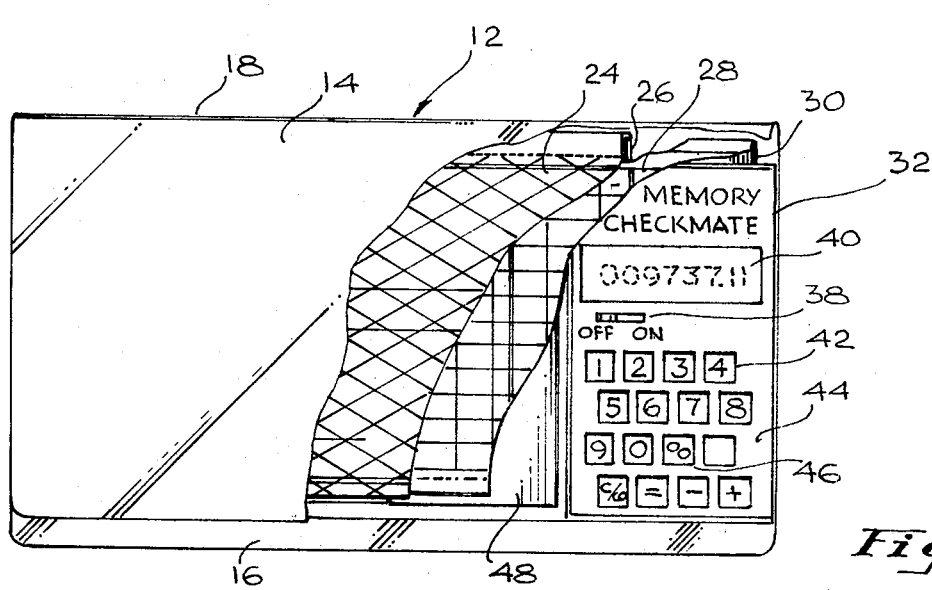
FIG. 1 is a schematic front elevation, partly broken away, of a first preferred embodiment of the improved portable check recordal device of the present invention, shown with the block, pad and calculator thereof in stored position within the closed cover thereof.

Now referring more particularly to FIG. 1 of the accompanying drawings, a first preferred embodiment of the improved check recordal device of the present invention is schematically depicted therein. Thus, device 10 is shown, which comprises a rectangular cover 12 which is open at the sides and bottom and has open front and rear plies 14 and 16 joined at the top 18. As shown more particularly in FIG. 3, ply 16 has an internal pocket 20 extending across the width of ply 16 and which is open at its upper end 22.

Device 10 also includes a block 24 of bank checks or the like, which block bears at its rear a tab 26 which is releasably inserted in pocket 20 to hold block 24 in place within cover 12. Device 10 further includes a check recordal pad 28 disposed behind block 24 and bearing at its rear a tab 30 which is releasably inserted in pocket 20 to hold pad 28 in place within cover 12. Positioned behind pad 28 within cover 12 is a calculator 32, preferably of the battery powered electronic type, secured to backing 33 bearing a tab 34 at one end, which tab 34 is releasably inserted in pocket 20 behind tabs 26 and 30.

Figure 2:
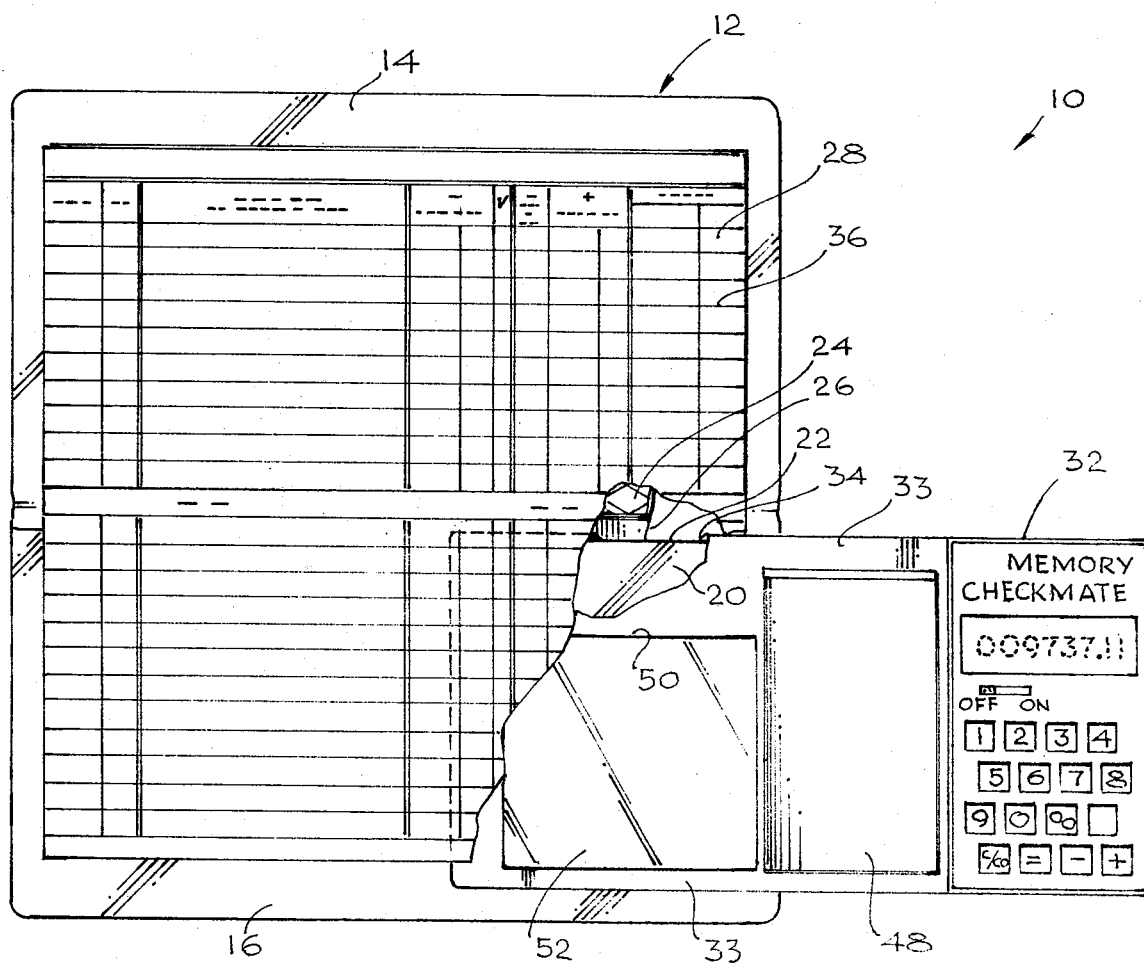
FIG. 2 is a schematic front elevation, partly broken away, of the device of FIG. 1, shown in the operational position, with the calculator thereof extended to the side of the open cover and with the check recordal pad open.

If desired, backing 33 may bear, in addition to calculator 32 and tab 34, a pad 48 of memo paper, a container (flat) 50 and/or a mirror 52 or the like, all of which are caused to be exposed for use with calculator 32 (FIG. 2). Thus, device 10 is compact, efficient, easy to use, produces a plurality of functions and is highly portable.

Figure 3:
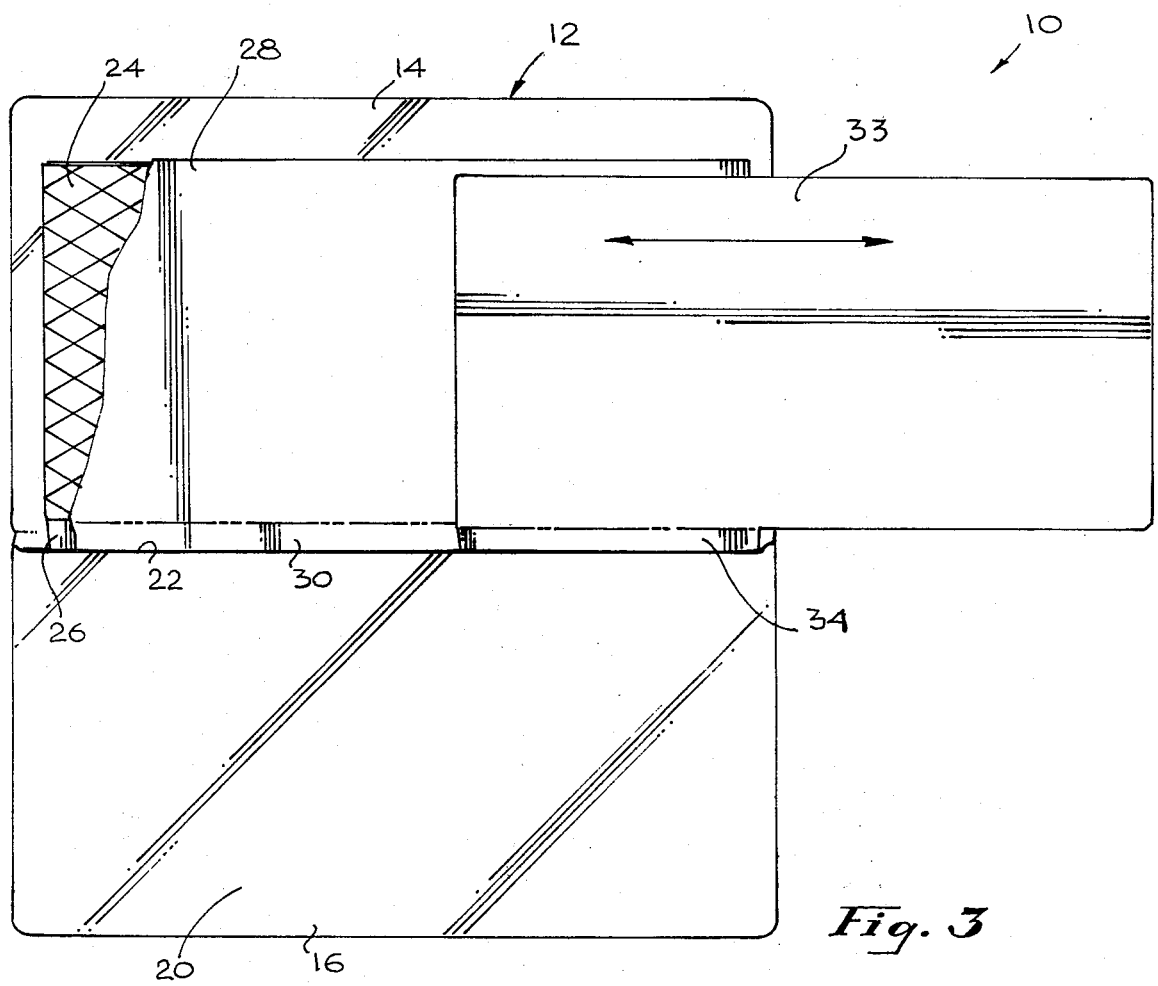
FIG. 3 is a schematic front elevation of the device of FIG. 1, with the cover open and the calculator extended, but with the recordal pad and calculator flipped up to show the reverse side thereof and the manner of connection of the calculator to the cover.

It will be noted that tab 34 is positioned and dimensioned sufficiently narrow in width relative to the width of pocket 20 so that tab 34 can be slid across the width of pocket 20 to move calculator 32 from a stored position within cover 12, as shown in FIG. 1, to a position lateral and outside of cover 12, as shown in FIGS. 2 and 3, ready for use in calculating check entries for pad 28. Thus, in the stored carrying position shown in FIG. 1, device 10 is compact and easily transportable, block 24, pad 28 and calculator 32 being disposed in stacked relation within cover 12.

When a check is to be drawn, ply 14 is flipped up, the check is written and removed from block 24, calculator 32 is slid to the exposed position (FIGS. 2 and 3), the check transaction information is then entered into the appropriate page 36 of pad 28 after opening pad 28, and then the necessary computations are worked out on calculator 32 (after turning it on by switch 38) and the running balance is determined thereon and entered on page 36 and pad 28 is then closed. Calculator 32 can then be turned off. Preferably, calculator 32 is capable of holding that balance for re-display in display window 40 thereof when calculator 32 is next turned on. Calculator 32 is then slid to its stored position within cover 12 and ply 14 is flipped down to the closed position for carrying and storage of device 10.

Calculator 32 can be of any suitable type, so long as it is thin and small. Conventional electronic calculators are suitable. Preferably, calculator 32 employs only addition and subtraction functions. Its keys 42 may be recessed below its front surface 44 to reduce the thickness of calculator 32. A double zero key 46 and a permanent decimal point (not shown) may be employed to simplify the calculator operation. Conventional solid state or other circuitry can be used to fabricate calculator 32 by any conventional manufacturing technique.

FIG. 4

A second preferred embodiment of the improved portable check recordal device of the present invention is schematically depicted in FIG. 4. The device 10a is similar to device 10 and components thereof which are substantially the same as those of device 10, bear the same numerals but are succeeded by the letter "a".

Device 10a is depicted in FIG. 4 in the operative position. Device 10a includes check block 24a, check recordal pad 28a, calculator 32a and cover 12a. Cover 12a includes pocket 20a in ply 16a, and also a pocket 54 in ply 14a. Pocket 54 has its opening facing down, that is, towards opening 20a, when ply 14a is flipped up. Tab 30a is disposed in pocket 54 but differs from tab 30 in that it is sufficiently narrow so that it and pad 28a connected to it can be slid sideways past the vertical midline of cover 12a (while tab 30a is still in pocket 54) so that pad 28a will extend lateral of a portion of cover 12a (see FIG. 4).

Similarly, tab 26a which is inserted in pocket 20a is dimensioned sufficiently narrow relative to pocket 20a so that tab 26a can be slid sideways in pocket 20a past the vertical midline of cover 12a in a direction opposite to that of tab 30a, so as to cause block 24a to extend lateral of a portion of cover 12a and so that all of block 24a is lateral of said vertical midline. With this arrangement, pad 28a and block 24a can be brought into the position shown in FIG. 4, that is, in side by side, parallel non-overlapping relation, for improved use of device 10a.

Block 24a has a backing 33a which bears on the front surface thereof adjacent the outer margin thereof a calculator 32a, so that when block 24a is moved into the position shown in FIG. 4, it carries calculator 32a with it.

In the operative position shown in FIG. 4, device 10a can be used by writing a check and removing it from block 24a, then moving block 24a up to expose calculator 32a to compute (when turned on) the necessary figures for entry into the appropriate page 36a, once pad 28a is opened. After device 10a has been used, calculator 32a can be turned off, recordal pad 28a can be closed (flipped up) and slid to the position wholly within cover 12a, check block 24a (with calcultor 32a) can be slid to the position wholly within cover 12a and cover 12a, that is, ply 14a can be closed to render device 10a portable and compact. It will be noted that the side-by-side alignment of block 24a (with calculator 32a) and pad 28a facilitates use of device 10a in the operative position. Thus, device 10a is easy and convenient to use.

Figure 5

A third preferred embodiment of the improved check recordal device of the present invention is schematically depicted in FIG. 5. The device of FIG. 5 is similar to device 10 and components thereof which are substantially the same bear the same numerals but are succeeded by the letter "b". Thus, device 10b is illustrated in FIG. 5 and comprises cover 12b, check block 24b, check recordal pad 28b and calculator 32b, the latter three components being held within cover 12b by tabs 26b, 30b and 34b, respectively, which tabs are disposed in pocket 20b of cover 12b. It will be noted that tabs 26b and 30b can be similar in width to the width of pocket 20b, as is the case with tabs 26 and 30 relative to pocket 20, or can be substantially narrower than pocket 20b, as is the case with tabs 26a and 30a relative to pocket 20a and 54.

Tab 34b is of specialized construction in that it is secured to one side 56 of calculator 32b and extends lateral thereof by a step 58 so that tab 34b is parallel to the main plane of calculator 32b but offset rearwardly therefrom. Tab 34b is also sufficiently narrow relative to pocket 20b to enable calculator 32b to be slid from a position behind block 34b and pad 28b within cover 12b to the position shown in FIG. 5, that is, fully lateral of cover 12b and fully exposed and ready for use. Thus, device 10b is a slightly simplified version of devices 10 and 10a and is operated similar thereto to provide similar advantages.

Although the above embodiments of the invention have been directed to standard regular checkbooks, the invention can readily be employed in conjunction with related recording products, such as regular savings bank passbooks which include a pad for recording interest payments, deposits, withdrawals, identification of uses of specific proceeds, etc., so that accurate arithmetic entries can be obtained.

Various changes, modifications, alterations and additions can be made in the improved device of the present invention and in its components and their parameters. All such changes, modifications, alterations and additions which are within the scope of the appended claims form part of the present invention.

What is claimed is:

1. An improved portable check recordal device comprising in combination:
   a. a cover having on inside surface a first pocket on one side of said cover and a second pocket on opposite side of said cover where openings of said pockets face each other;
   b. a block of checks having a backing on the front surface thereof and having a retaining tab with a width slightly less than half the width of said first pocket and where tab is disposed in said first pocket, and where block is movable between a first position within said cover to a second position lateral of a position of said cover;
   c. a check recordal pad having a retaining tab with a width slightly less than half the width of said second pocket and where tab is disposed in said second pocket, and where pad is movable between a first position within said cover to a second position lateral of a position of said cover, and in a direction opposite to that of said block, and where said pad and said block are in a side-by-side non-overlapping relationship between each other;

d. a check calculator affixed to said backing of said block by affixing means whereby when block is moved said calculator is also moved.

2. The improved device of claim 1 wherein said calculator has affixing means to be affixed to either said pad or to said block for movement therewith.

3. The improved device of claim 1 wherein said retaining tabs are disposed in the same pocket in said cover.

4. The improved device of claim 1 wherein said calculator is affixed to a separate backing having a retaining tab with a width slightly less than half the width of said first or second pocket and where said tab is disposed in either said first or second pocket and where said backing bears at least one memo pad, flat container, and mirror, and where backing is movable between a first position within said cover to a second position lateral of a position of said cover.

* * * * *